Feb. 19, 1935.　　　W. STEIN　　　1,992,100

TESTING FLAWS AND THE LIKE IN WORKING MATERIALS

Filed June 13, 1932

Inventor:
Wilhelm Stein

Patented Feb. 19, 1935

1,992,100

UNITED STATES PATENT OFFICE 1,992,100

TESTING FLAWS AND THE LIKE IN WORKING MATERIALS

Wilhelm Stein, Dusseldorf, Germany

Application June 13, 1932, Serial No. 617,000
In Germany June 20, 1931

8 Claims. (Cl. 175—183)

Magnetic processes for detecting flaws and pipings, segregations, decarburized places and the like, and for determining the kind of heat treatment for working materials and pieces of work are already known. These known processes are based, for example, on a measurement of the stray lines of magnetic force through the faults. These and modified processes and apparatus have the drawback that different kinds of processes must be separately employed for testing the faults, since there is no known process which determines at the same time all the faults both in a longitudinal and transverse magnetization. The stray line process requires also the magnetization to be controlled very exactly, since small changes lead to a result which is either false or may give rise to errors. Also, there is the drawback that in the known testing processes it is necessary to use very sensitive registering and indicating instruments, since the currents to be tested are too weak to be measured by other instruments.

The invention consists in a magnetic process, and apparatus for carrying out the process, for testing working materials or pieces of work which are so formed that the test currents determine, not only the faults in a longitudinal magnetization, but, for the first time, also all faults in the cross magnetization. The test or main currents of the apparatus according to the invention are controlled and concentrated and react so strongly, that all the faults and unsymmetrical positions can be determined without the use of controlling or amplifying members, for example a potentiometer, more satisfactorily than was possible previously, and by means of very simple registering and indicating instruments. It also enables, by changing the coil connections, the apparatus to be adapted to the kind of current available at that time, for example alternating or direct current. The circuit connections according to the invention also for the first time enable changes in the different coils or groups of coils to act directly, together or separately, on mechanically registering instruments. This was not previously possible, since the voltages used in the tests in the known processes could only be indicated by mirror galvanometers, oscillographs or the like instruments, of which the cost is very considerable.

The apparatus according to the invention consists of main coils which set up a normally neutral zone in the fields between them and a test coil disposed in said neutral zone, the currents in which act on an indicating device. The circuit arrangements according to the invention provide, at the neutral boundary of the test fields, a force which indicates the faults of the material which react on the longitudinal and also on the transverse magnetization. The force can be applied, consequently, to an instrument, for example to a cathode ray tube or to simple mechanical registering instruments.

Arrangements according to the invention are shown in the accompanying drawing.

Figure 1:
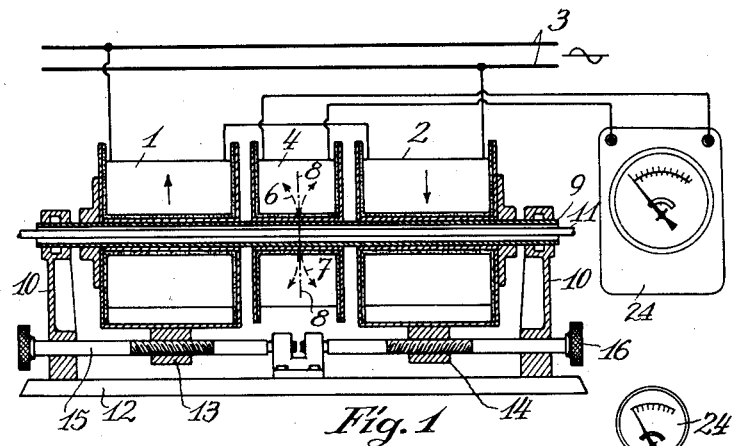
Fig. 1 shows the main coils and the test coils in combination with a single measuring instrument.

1 and 2 are the main coils connected to a current network 3. Between the coils 1 and 2, one or more test coils 4 is or are provided connected to an indicating instrument 24. The coil 4 is acted on by the circular magnetic lines of force 6 and 7 of the coils 1, 2, the directions of which are opposed to one another, and the work is led through the neutral zone 8 between the coils 1 and 2. For testing the work, the coils are mounted on a hollow spindle 9 and supported in bearings 10. 11 represents the work, for example a wire, which during the test is drawn, preferably at uniform velocity, through the spindle 9. The bearings may be mounted on a plate 12 and for the purpose of regulating their distance apart the coils are provided with screw-threaded lugs 13, 14 engaging with threaded spindles 15, 16.

The action of the apparatus is as follows: The work 11 is introduced into and drawn through the hollow spindle 9. Two effective circular lines of force 6 and 7, directed in opposite directions, are produced which are affected by any faults in the material. Due to this action, the current in the test coil, acting on the indicating instrument, is modified. The apparatus, while extremely simple, is so sensitive that, for example with cast steel wires of 1.2 mm., any torsional changes of + or —1 units are correctly indicated. The magnetization of the work is regulated by adjusting the distance apart of the coils. This regulation can also be effected by connecting the opposite poles of the main coils, for example by an adjustable iron yoke, so that the magnetic field inside the test coil is modified.

Figure 2:
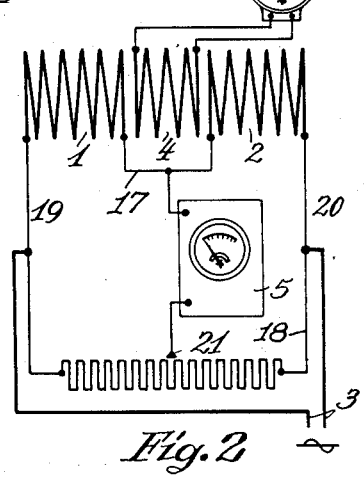
Fig. 2 shows the main coils arranged in a Wheatstone bridge connection.
Figure 3:
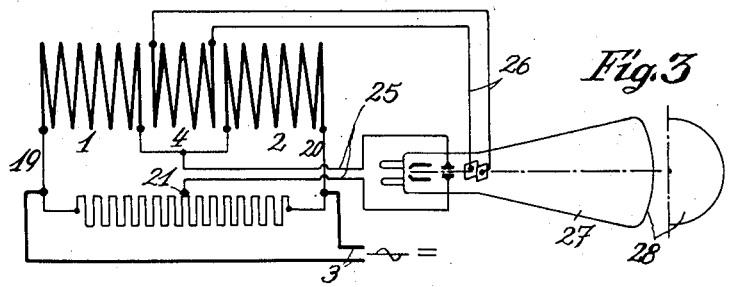
Fig. 3 shows the circuit arrangements according to Fig. 2 in combination with a cathode ray tube.

In the arrangement according to Figs. 2 and 3 the working material or work is affected only by the main coils 1 and 2 fed either with alternating or direct current, or by a similar group of coils as in Fig. 1, the group of coils in that case being arranged in a Wheatstone bridge circuit for indicating changes or faults and separately or together connected to the indicating instruments.

The coils 1 and 2 are provided with Wheatstone bridge connections 17, 18 and connected to an indicating instrument 5. Besides the arms 19 and 20 of the bridge connection in Fig. 2 are equalized or controlled by the position of the contact point 21 and are also affected by any faults in the working material. Besides the arms 19 and 20 any modifications of the magnetic fields of the main coils, in addition to the changes in the arms, act on the indicating instrument 5.

The arrangement shown in Fig. 2 is particularly suitable, if changes in the hardness and so on are to be tested, since such changes are preferably indicated by currents due to magnetic induction. Preferably, separate indicating instruments 5 and 24 are arranged for the two sets of coils.

In the previously described arangements of the testing apparatus, it was of importance, what coils or sets of coils, for example main coils and test coils, or only main coils, and what kind of current was used as the feed current. The definite determination of the form of the apparatus, due to the direct connection of the mechanical indicating instruments 5 and 24, can be avoided, if, instead of the mechanical instruments, a single cathode ray tube is employed.

Fig. 3 shows an instrument of this kind in which the branch circuits 25 and 26, which were previously connected to the measuring instruments, are connected to the well-known cathode ray tube 27. The changes in the material are indicated on the screen 28, for example the arrangement being such that arms 19 and 20 act at right angles to one another and plane or curved optical traces are formed on the screen 28, corresponding to the properties of the parts of the material under test.

The apparatus can be considerably modified within the scope of the invention.

I claim:—

1. Apparatus for testing magnetizable pieces of work and working material, comprising a source of current, main coils energized from said source and setting up a normally neutral zone in the fields between them, a test coil disposed in said normally neutral zone, an indicating instrument connected to said test coil, and a hollow spindle on which said main coils and said test coil are mounted and through which the work to be tested is moved.

2. Apparatus for testing magnetizable pieces of work and working material, comprising a source of current, main coils energized from said source and setting up a normally neutral zone in the fields between them, a test coil disposed in said normally neutral zone, an indicating instrument connected to said test coil, a hollow spindle on which said main coils and said test coil are mounted and through which the work to be tested passes, and means for adjusting the distance apart of said main coils.

3. Apparatus for testing magnetizable pieces of work and working material, comprising a source of current, main coils energized from said source and setting up a normally neutral zone in the fields between them, a test coil disposed in said normally neutral zone, an indicating instrument connected to said test coil, a hollow spindle on which said main coils and said test coil are mounted and through which the work to be tested passes, a fixed bearing supporting each end of said spindle, and means for adjusting the distance apart of said main coils, said means comprising a screw-threaded lug associated with each of said coils and a screw-threaded spindle mounted in each of said bearings and engaging with said lugs.

4. Apparatus for testing magnetizable pieces of work and working material, comprising a source of current, main coils energized from said source and setting up a normally neutral zone in the fields between them, a test coil disposed in said normally neutral zone, and an indicating instrument connected to said test coil, said main coils and said test coil each having an axial passageway through which the work to be tested passes, said main coils forming the arms of a Wheatstone bridge circuit, the diagonal of said bridge being connected to said indicating instrument.

5. Apparatus for testing magnetizable pieces of work and working material, comprising a source of current, main coils energized from said source and setting up a normally neutral zone in the fields therebetween, a test coil disposed in said normally neutral zone, and an indicating instrument connected to said test coil, said main coils and said test coil each having an axial passageway for the work to be tested, said main coils forming the arms of a Wheatstone bridge circuit, the diagonal of said bridge being connected to said indicating instrument, and a separate indicating instrument to which said test coil is connected.

6. Apparatus for testing magnetizable pieces of work and working material, comprising a source of current, main coils energized from said source and setting up a normally neutral zone in the fields therebetween, a test coil disposed in said normally neutral zone, an indicating instrument connected to said test coil, said main coils and said test coil each having an axial passageway for the work to be tested, said main coils forming the arms of a Wheatstone bridge circuit, and a mechanically operating measuring instrument to which the diagonal of said bridge is connected.

7. Apparatus for testing magnetizable pieces of work and working material, comprising a source of current, main coils energized from said source and setting up a normally neutral zone in the fields therebetween, a test coil disposed in said normally neutral zone, an indicating instrument connected to said test coil, said main coils and said test coil each having an axial passageway for the work to be tested, said main coils forming the arms of a Wheatstone bridge circuit, a mechanically operating measuring instrument to which the diagonal of said bridge is connected, and a separate indicating instrument to which said test coil is connected.

8. Apparatus for testing magnetizable pieces of work and working material, comprising a source of current, main coils energized from said source and setting up a normally neutral zone in the fields therebetween, a test coil disposed in said normally neutral zone, said main coils and said test coil each having an axial passageway for the work to be tested, said main coils forming the arms of a Wheatstone bridge circuit, a cathode ray tube and means by which the current in the diagonal of said bridge and the current in said test coil affect the discharge in said cathode tube, and a screen on which the cathode rays impinge.

WILHELM STEIN.